(12) United States Patent
Agrotis

(10) Patent No.: US 6,802,213 B1
(45) Date of Patent: Oct. 12, 2004

(54) METHOD AND APPARATUS FOR TIRE PRESSURE MONITORING

(75) Inventor: Demetris Andreou Agrotis, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/460,536

(22) Filed: Jun. 12, 2003

(51) Int. Cl.[7] ............................................. G01M 17/02
(52) U.S. Cl. ......................................................... 73/146
(58) Field of Search ............................ 73/146; 340/442, 340/440, 447

(56) References Cited

U.S. PATENT DOCUMENTS

| | | |
|---|---|---|
| 5,218,862 A | 6/1993 | Hurrell, II et al. ......... 73/146.5 |
| 5,721,374 A | 2/1998 | Siekkinen et al. ......... 73/146.2 |
| 6,161,905 A | 12/2000 | Hac et al. |
| 6,369,703 B1 | 4/2002 | Lill |
| 6,481,806 B1 | 11/2002 | Krueger et al. |
| 2002/0157461 A1 | 10/2002 | Schmidt et al. ............... 73/146 |
| 2003/0030553 A1 | 2/2003 | Schofield et al. ........... 340/442 |

*Primary Examiner*—Edward Lefkowitz
*Assistant Examiner*—Andr Allen
(74) *Attorney, Agent, or Firm*—Jimmy L. Funke

(57) ABSTRACT

The relative speed of each of the tires of a vehicle is monitored as an indication of the operating state of the vehicle, wherein if the vehicle is not operating in one of a number of predetermined states, the relative speed is monitored as an indication of relative pressure of the vehicle tires, and further wherein differences in relative speed not related to the predetermined states, and not related to differences in relative pressure, are accounted for. In addition, a single tire pressure sensor is employed to account for over or under inflation of substantially equal proportion in the tires.

28 Claims, 6 Drawing Sheets

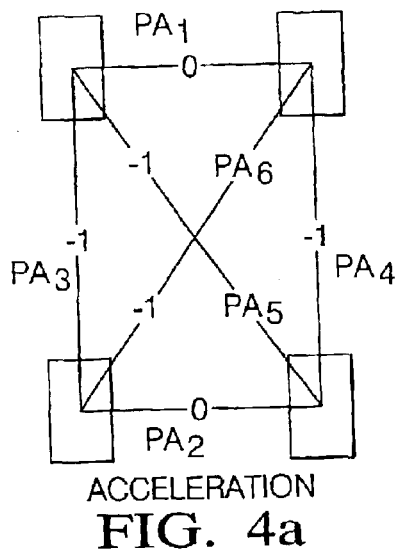

FIG. 4a ACCELERATION $$[PA] = \begin{bmatrix} PA_1 \\ PA_2 \\ \vdots \\ PA_6 \end{bmatrix} = \begin{bmatrix} 0 \\ 0 \\ -1 \\ -1 \\ -1 \\ -1 \end{bmatrix}$$

FIG. 4b

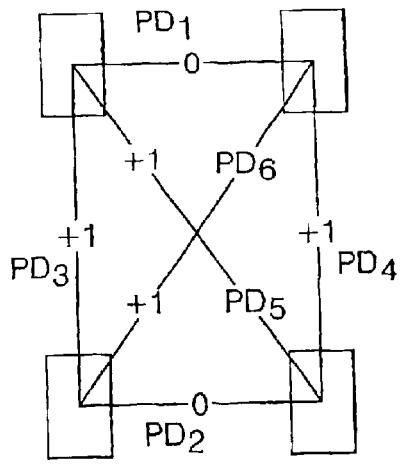

FIG. 4c DECELERATION $$[PD] = \begin{bmatrix} PD_1 \\ PD_2 \\ \vdots \\ PD_6 \end{bmatrix} = \begin{bmatrix} 0 \\ 0 \\ +1 \\ +1 \\ +1 \\ +1 \end{bmatrix}$$

FIG. 4d

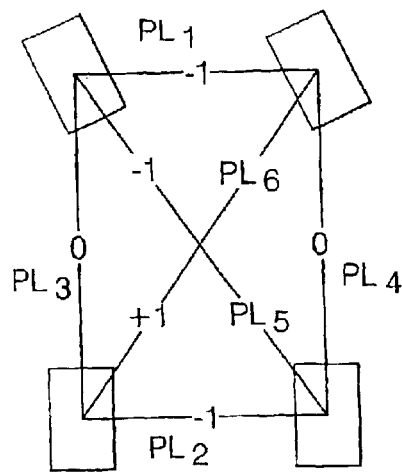

FIG. 4e LEFT TURN $$[PA] = \begin{bmatrix} PL_1 \\ PL_2 \\ \vdots \\ PL_6 \end{bmatrix} = \begin{bmatrix} -1 \\ -1 \\ 0 \\ 0 \\ -1 \\ +1 \end{bmatrix}$$

FIG. 4f

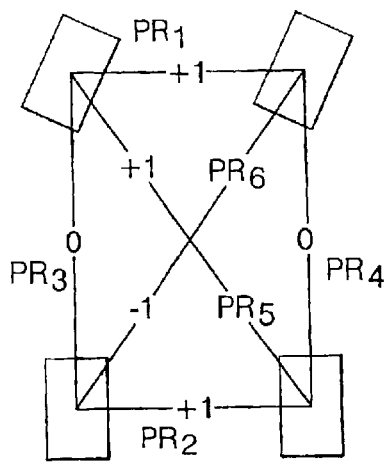

RIGHT TURN
FIG. 4g $$[PR] = \begin{bmatrix} PR_1 \\ PR_2 \\ \vdots \\ PR_6 \end{bmatrix} = \begin{bmatrix} +1 \\ +1 \\ 0 \\ 0 \\ +1 \\ -1 \end{bmatrix}$$

FIG. 4h

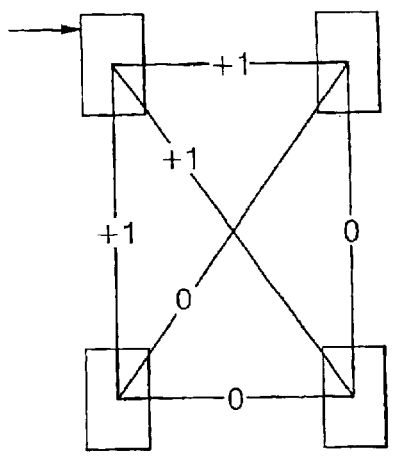

LEFT FRONT
FIG. 5a $$[PLLF] = \begin{bmatrix} PLLF_1 \\ PLLF_2 \\ \vdots \\ PLLF_6 \end{bmatrix} = \begin{bmatrix} +1 \\ 0 \\ +1 \\ 0 \\ +1 \\ 0 \end{bmatrix}$$

FIG. 5b

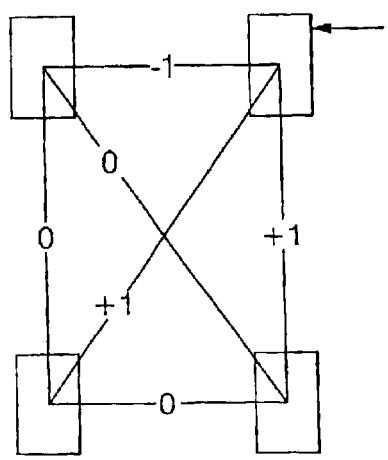

RIGHT FRONT
FIG. 5c $$[PLRF] = \begin{bmatrix} PLRF_1 \\ PLRF_2 \\ \vdots \\ PLRF_6 \end{bmatrix} = \begin{bmatrix} -1 \\ 0 \\ 0 \\ +1 \\ 0 \\ +1 \end{bmatrix}$$

FIG. 5d

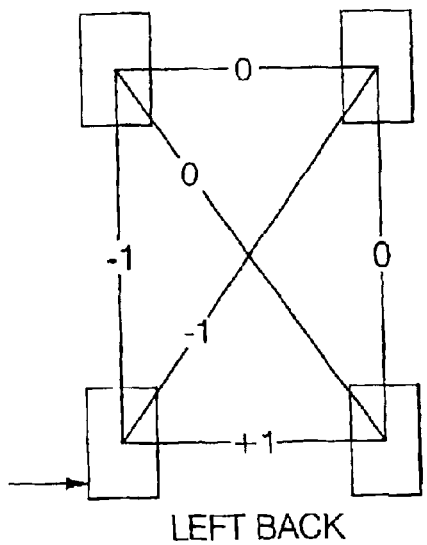
LEFT BACK
FIG. 5e
$$[PLLB] = \begin{bmatrix} PLLB_1 \\ PLLB_2 \\ \vdots \\ PLLB_6 \end{bmatrix} = \begin{bmatrix} 0 \\ +1 \\ -1 \\ 0 \\ 0 \\ -1 \end{bmatrix}$$
FIG. 5f
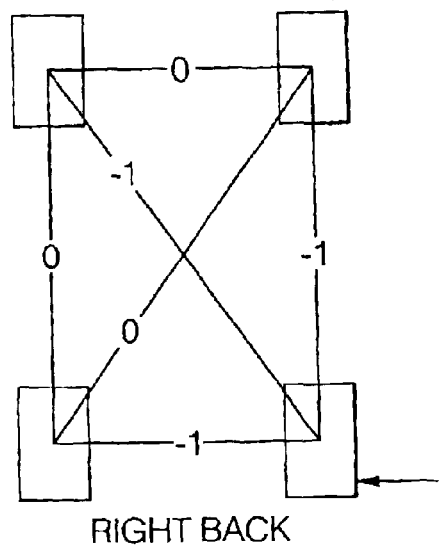
RIGHT BACK
FIG. 5g
$$[PLRB] = \begin{bmatrix} PLRB_1 \\ PLRB_2 \\ \vdots \\ PLRB_6 \end{bmatrix} = \begin{bmatrix} 0 \\ -1 \\ 0 \\ -1 \\ -1 \\ 0 \end{bmatrix}$$
FIG. 5h

METHOD AND APPARATUS FOR TIRE PRESSURE MONITORING

BACKGROUND

Motor vehicles are supported by inflatable tires having a desired inflation pressure. Improper inflation of a tire can lead to poor gas mileage and increased tire wear. Maintaining tire inflation within an acceptable range can alleviate these issues. To do so however, requires frequent measuring of tire pressure and evaluation of whether that pressure lies within an acceptable range. Moreover, tire pressure will also vary according to temperature and vehicle load.

There are several advantages to maintaining the pneumatic tires of an automobile at the inflation pressure recommended by the tire or vehicle manufacturer. Vehicle handling characteristics are maintained when all tires are inflated to the condition specified by the vehicle designer. The loss of pressure in one or more tires on the vehicle may result in less than optimum driver control. Inadvertent over-inflation of one or more tires may also result in less than optimum vehicle handling. Operating a vehicle with tire pressures outside the recommended inflation range can also reduce tire life due to excessive flexing and heating and resultant fatigue or wear. Tire pressure monitoring systems have been developed which alert the vehicle operator when the pressure in one or more of the tires fitted to the vehicle is outside a predetermined range.

Indeed, following an increase in public awareness of the potential consequences of operating tires outside the manufacturers recommended pressure range, legislation has been introduced such as proposed FMVSS 138 which requires that a tire pressure monitoring system be installed as original equipment on all new vehicles sold in the United States after November 2003.

While several tire pressure-monitoring methods have been proposed, two general approaches have been favored. One is indirect and relies on the determination of the rolling radius of each hub and tire assembly (and often linked to the anti-lock brake system (ABS) of the vehicle). The second is direct and relies on the wireless transmission of a signal from a transducer module installed in the pressurized cavity of each tire. Such systems work well for their intended purposes, but there are disadvantages.

The rolling radius method relies on the signals generated by wheel rotation sensors, typically installed as part of an anti-lock braking system. The rolling radius represents the actual radius from the center of the tire to the generally flattened area of the tire in contact with the ground. Because of the flattening at the point of contact of the tire and the road or surface, the rolling radius measures smaller than the nominal radius of the tire as manufactured or unloaded, since the nominal radius does not account for variation in pressure within the tire and load on the tire. Since the rotational speed of each wheel is known accurately, the rolling radius of the hub and tire assembly mounted at each wheel can be inferred. This system of tire pressure monitoring (frequently referred to in the art as ABS-tire pressure monitoring) does not, however, provide absolute values of pressure, nor does it provide tire temperature information. If all of the tires on the vehicle were to lose pressure equally over time, such a system may fail to detect a reduction in pressure in any tire. Also, this system requires that data be gathered over some minimum number of wheel rotations in order to allow tire temperatures to equalize to some extent, to determine relative rolling radii, and then to approximate each tire pressure. This type of system is not well suited to anything other than installation as original equipment. While this type of system is a low cost addition to a vehicle equipped with anti-lock brakes, it has many performance shortcomings. One of the major deficiencies of this system is that if all tires are over or under inflated, the differential wheel speed measurements between wheels are not capable of detecting the condition.

The direct sensing method requires the installation of a wireless module in contact with the gas within the pressurized cavity of each tire and hub assembly. A matched receiving module is installed on a fixed portion of the vehicle such that the transmitted data may be processed and presented to the vehicle operator as required. A receiver may be positioned within each wheel well of the vehicle, in which case it is necessary to install one receiver for each monitored tire on the vehicle, or, a single receiver may be placed approximately centrally within the vehicle, such as at the interior rearview mirror location. The significant disadvantage of multiple receivers is the high additional cost. Additionally, installation is difficult unless installed as original equipment.

Thus, there is a need for an improved tire pressure monitoring system that overcomes the above disadvantages.

SUMMARY OF THE INVENTION

Disclosed generally herein is a method and apparatus for determining the pressure of the vehicle tires via the sensed speed of the vehicle wheels and the tire pressure of a single tire. The present invention substantially reduces its susceptibility to false alarms by determining whether a variation in wheel speed is due to some external factor, or is due to a loss in pressure in one or more tires. Further, the present invention discloses a cost effective means for tire pressure monitoring without employing a pressure sensor in each tire, such that using a differential wheel speed algorithm in conjunction with a single tire pressure sensor allows determination of over or under inflation even if all of the tires are over/under inflated to the same level.

To effectively reduce the risk of false alarms in the system caused by external factors, the present invention generally develops predetermined models of the relationship between the individual wheel speed values for a variety of operating scenarios. The scenarios are those that would cause notable wheel speed variations not attributable to loss of tire pressure, such as the above-described external factors. The models thus developed are made available to the routine in accord with the present invention, and are compared to the sensed speed of the individual wheels. Generally, from this comparison, if it is determined that the vehicle is operating in such a manner that the present wheel speed data is not useful for the determination of tire pressure, the data is discarded, and the present iteration of the routine is terminated.

Otherwise, the wheel speed data and single tire pressure data are compared to predetermined models of what the data should resemble if there is at least a threshold loss of pressure in a vehicle tire. If this comparison indicates a sufficient loss of tire pressure, the routine provides an indication thereof to the vehicle operator, who can then take appropriate action.

The above described and other features are exemplified by the following figures and detailed description.

BRIEF DESCRIPTION OF THE DRAWINGS

Referring now to the figures wherein the like elements are numbered alike:

FIGS. 4a through 4h are diagrams describing examples of wheel delta speed patterns for some vehicle maneuvers; and FIGS. 5a through 5h are diagrams describing wheel delta speed patterns for tire leaks.

DETAILED DESCRIPTION

The inflation pressure of conventional automotive tires is related to the tire radius in that, to an extent, increasing the tire pressure increases the radius. Further, tire radius is related to tire rotation speed in that, for a given vehicle speed, the tire rotation speed will increase as the tire radius decreases. Accordingly, by relating the tire (wheel) speed of the vehicle tires to each other, all of which are subject to a common vehicle speed, information on the tire radius and thus on the individual tire inflation pressure is made available.

Vehicles are available that already have the necessary hardware for constant monitoring of wheel speed of each of the vehicle's wheels. Accordingly, to implement a system that determines tire pressure status purely on wheel speed information may be relatively inexpensive, as generally only an algorithm to interpret the already available wheel speed data, and perhaps a low pressure indicating means is needed.

Unfortunately, wheel speed information can indicate things other than deviations in tire pressure. For instance, wheel speed variations may be experienced when the vehicle is turning, is accelerating or decelerating, is going up or down steep grades, when at least one of the vehicle wheels is slipping, or when there is a cross wind bearing in the vehicle. Furthermore, wheel speed information may not indicate deviations in tire pressure when any deviation is substantially the same for all tires involved. For example, if after a period of time, each tire loses the same amount of pressure or each is under inflated to substantially the same value, relative wheel speed information is inadequate to detect such a condition.

These "external factors", unless properly accounted for, can erode the accuracy of the pressure monitoring system, and can cause false indications of low tire pressure or fail to indicate the same. Further, idiosyncrasies in the vehicle itself may bias the individual wheel speed values, increasing the potential for false indications of pressure loss. Such biases are typically difficult to account for, for instance by a predetermined model of vehicle behavior, as the biases are often vehicle specific, and can change in unpredictable ways throughout the life of the vehicle.

In response to the above-described external factors, the present invention compensates therefore by detecting when the factors are at work, and by dismissing the data skewed thereby as not being indicative of loss of tire pressure. Further, the present invention develops an adaptive model of the behavior of the wheel speed information in the absence of external factors, and in the absence of detected leaks in the tires. The model is continuously updated so as to make available an updated account of the vehicle bias not due to external factors or tire leaks. The present invention uses this information to further screen the wheel speed data in conjunction with a known tire pressure with respect to one of the tires.

Figure 1:
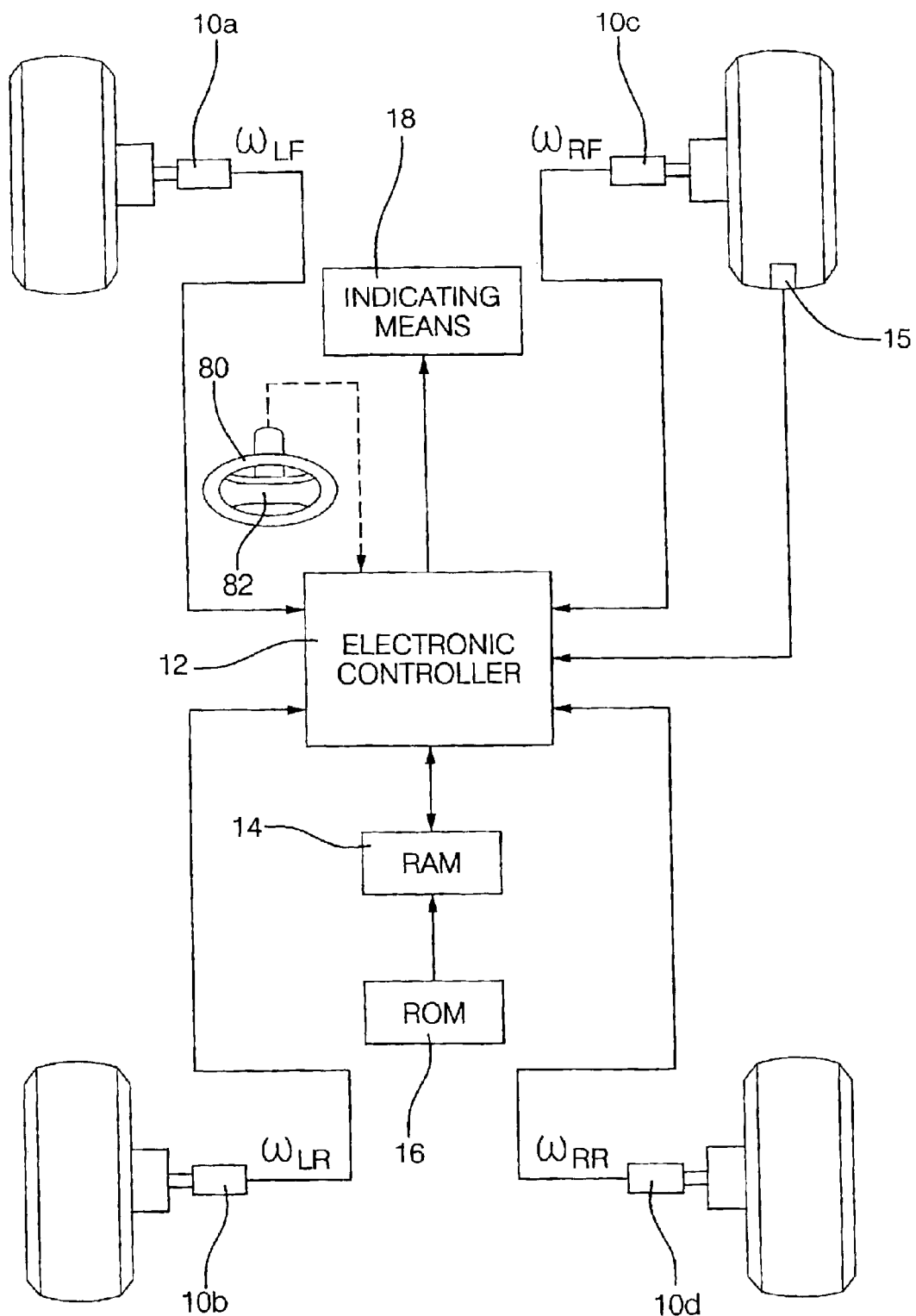
FIG. 1 is a general diagram of the hardware used to carry out this invention in accord with this embodiment.

The hardware necessary to sense and process the wheel speed at the four wheels is shown in FIG. 1. Conventional wheel speed sensors 10a, 10b, 10c, and 10d are located at the wheels of a conventional automotive vehicle, and provide the speed of the left front wheel $w_{LF}$, the right front wheel $w_{RF}$, the left rear wheel $w_{LR}$, and the right rear wheel $w_{RR}$ to a conventional electronic controller 12, such as a Motorola MC68HC11 single chip microcomputer. The wheel speed information is stored in conventional microcomputer random access memory 14. At pre-specified times during the operation of the controller, information is transferred from the conventional read only memory 16 to random access memory 14, so as to be more accessible to controller 12.

Still referring to FIG. 1, a tire pressure sensor 15 is mounted at a right front wheel, however any one of the four driven wheels may be selected for mounting sensor 15 thereat. For example, tire pressure sensor 15 may be respectively located in a tire mounted at the driver-side front wheel, a tire mounted at the driver-side rear wheel, a tire mounted at the passenger-side front wheel, and a tire mounted at the passenger-side rear wheel on the vehicle. Such a sensor includes a pressure transducer capable of measuring tire inflation pressure, and preferably includes a transmitter (such as a radio frequency (RF) transmitter or the like) for wireless communication of this data to controller 12 or another controller located in the interior of the vehicle. Tire pressure sensor provides an actual measured pressure output for the actual measured tire pressure in the respective tire to controller 12. The sensor is moved with its respective tire when the tires are changed or rotated, while the wheel locations remain fixed on the vehicle.

The term "tire," as used herein, refers to the tire and hub combination or assembly, which is mounted to a wheel of the vehicle. Also, the term "wheel" refers to the particular rotatable portion of the corner assembly or the like of the vehicle. Each wheel includes the lugs or studs extending therefrom (on which the hub and tire is mounted) and may include the rotor or drum of the brake system of the vehicle. The tires and any associated sensor 15 may be rotated or moved from one wheel of the vehicle to another, while the wheels remain generally fixedly positioned at the respective corners of the vehicle.

Sensor 15 may be installed by strapping or otherwise attaching the sensor to the hub rim within the tire, by replacing the tire valve stem with a combined tire valve and sensing module, or by attachment of the sensor to the exterior of the existing tire valve, or by any other means which mounts or positions the sensor at least partially within or in communication with the pressurized chamber of the tire, without affecting the scope of the present invention. Sensor 15 may be battery powered, may use wheel motion to generate power, or may rely on induction from a source mounted on a fixed portion of the vehicle, without affecting the scope of the present invention. Sensor 15 preferably incorporates a pressure transducer, a temperature sensing means, a processor to encode data in a format unique to the module, and a transmitter, such as an RF transmitter or the like.

Controller 12 includes an antenna (not shown, such as a radio frequency or RF antenna) and receiver circuitry for the tire pressure signal wirelessly broadcast from sensor 15 (as shown in FIG. 1). Controller 12 is preferably positioned within the interior of the vehicle, and preferably at, within or on an interior rear view mirror assembly or at, within or on an overhead console (not shown) in the interior cabin of the vehicle. The controller 12 may receive a generally continuous input from pressure sensor 15 and may generate a pressure pattern or pressure signature for the particular tire having sensor 15 for a given period of time, such as for a predetermined period of time following each activation of the vehicle ignition or the like.

Preferably, the location or wheel at which the particular pressure sensor 15 and tire is mounted is stored in the controller's memory when the vehicle is shut off, such that the location or wheel at which sensor 15 is positioned is known at the time of the next start up of the vehicle. Upon starting and driving the vehicle, controller 12 may compare the pressure output data from the sensor with the particular deduced characteristic pattern or signature associated with the previously known sensor location or wheel. If the measured pressure matches the pattern or signature at the previous location or wheel at which the sensor and tire was located, the control need not make any further comparison of the pressure data with other patterns of deduced characteristics, since the control may conclude that the position of the tires on the vehicle has not changed from the previously known location (i.e., the tires were not rotated while the ignition was off). However, if the patterns do not match, the controller may then compare the pressure sensor output with each of the other characteristic patterns or signatures for each of the other wheel locations via wheel speed sensors 10a–10d, in order to determine the new wheel or location of the particular tire and sensor. After the wheel or location is determined, controller 12 may display the pressure output from the pressure sensor 15 and the corresponding location or wheel of the output on a display or indicating means 18. By only conducting further comparisons of the patterns or signatures of the position of the sensor (and tire) appears to have changed, the tire pressure monitoring system of the present invention provides a quick confirmation of the location of the pressure sensor and tire without further evaluation of data unless such further evaluation is necessary to determine the new wheel or location of the pressure sensor and tire.

The wheel speed information from wheel speed sensors 10a–10d is used to determine first whether the vehicle is operating in a manner wherein it is assumed that reliable tire pressure information is available from the wheel speed data. If reliable information is available, the wheel speed data is used to determine whether there has been a recent pressure loss in one of the vehicle tires in conjunction with the tire pressure output. The vehicle operator is notified via indicating means 18 if such a loss is found.

Figure 2:
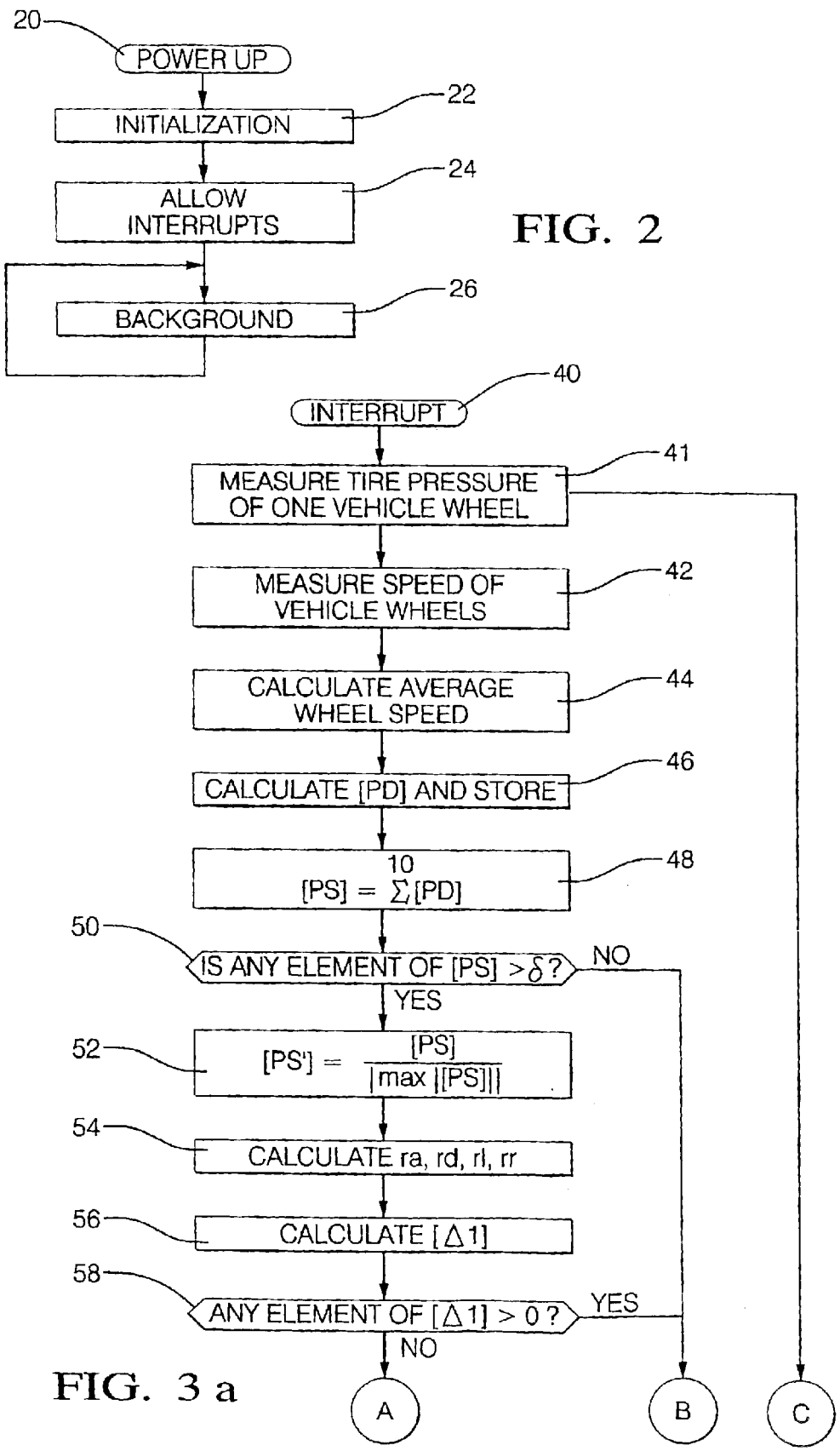
FIGS. 2, 3a, and 3b are computer flow diagrams used to carry out the steps in accord with this invention.
Figure 3:
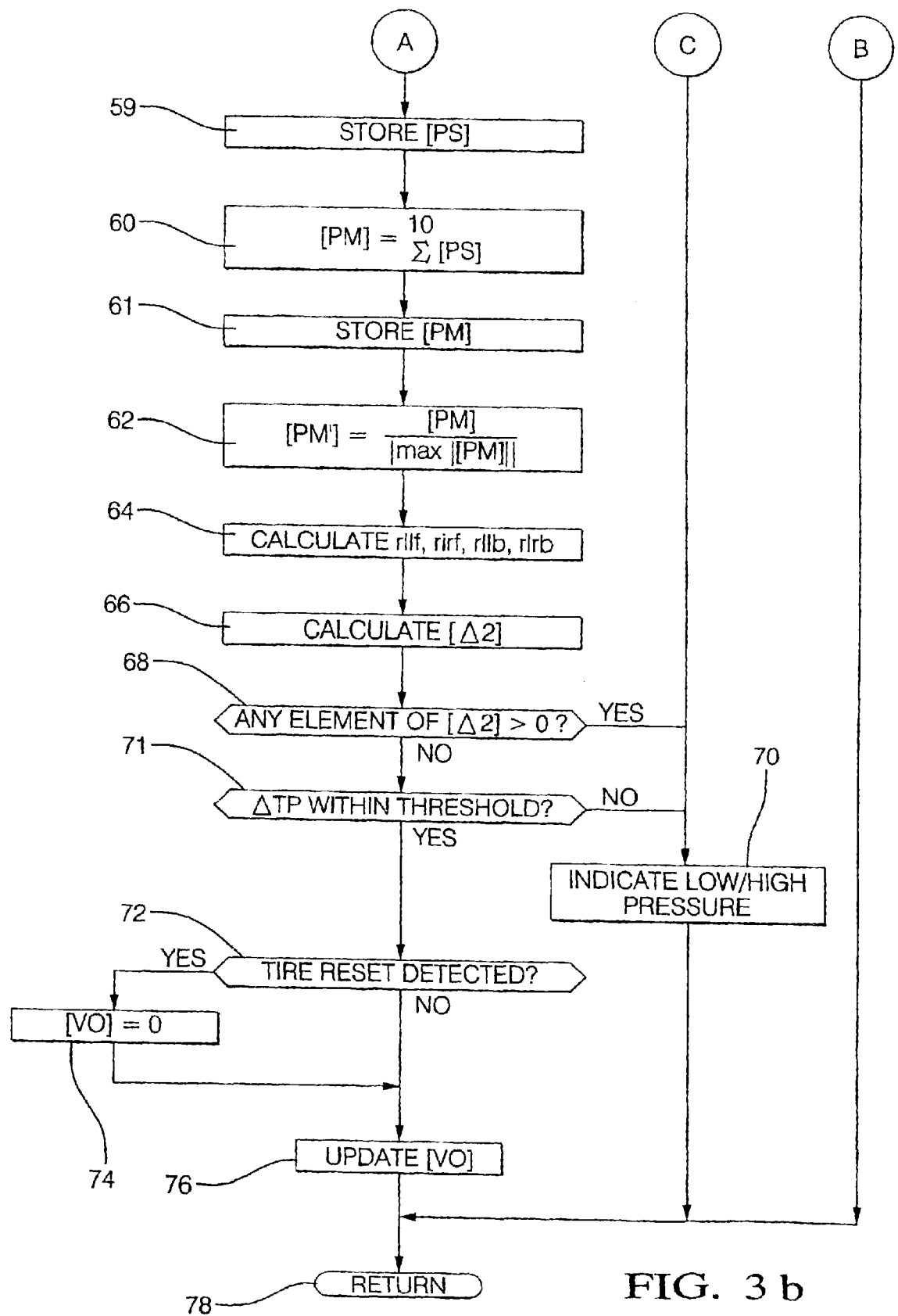

The routines used to process the wheel speed information so as to make the above-described determinations are illustrated in FIGS. 2, 3a, and 3b. When power is first applied to the system, such as when the vehicle ignition switch is rotated to its "on" position, the routine of FIG. 2 is initiated at point 20, and proceeds to block 22, to provide for general system initialization. For example, at this step initial values stored in the computer read only memory ROM 16 are entered into ROM designated random access memory 14 locations, and counters, flags and pointers are initialized.

After the initialization block, the routine proceeds to block 24 where interrupts are enabled, such as by resetting the interrupt mask bit in the condition code register. Next, the routine proceeds to a background loop at block 26, which is continuously repeated. This loop may include, for example, diagnostic and maintenance routines. In this embodiment, the background routine is interrupted every 100 milliseconds to execute the routine used to carry out the blocks specifically embodying the principles of this invention.

This routine is illustrated in FIGS. 3a and 3b, and is entered, upon the occurrence of the 100 millisecond interrupt, at block 40. The routine proceeds to block 41 to measure the tire pressure of one of the vehicle wheels, for example using tire pressure sensor 15 illustrated in FIG. 1. If sensor 15 detects a pressure higher or lower than a threshold value, then block 70 discussed more fully below with respect to FIG. 3b. Next, the routine proceeds to block 42 to measure the angular speed of the vehicle wheels, for example using the four sensors 10a–10d illustrated in FIG. 1. The routine then proceeds to block 44, to calculate the vehicle speed as an average of the four wheel speed values, as measured by the sensing configuration of FIG. 1, according to the following equation:

$$W_{avg}=(W_{LF}+W_{RF}+W_{LR}+W_{RR})/4.$$

The routine then proceeds to block 46 to calculate [PD], which is a matrix of adjusted delta speed patterns, according to the following equation:

$$[PD] = \begin{bmatrix} \Delta F \\ \Delta B \\ \Delta L \\ \Delta R \\ \Delta D \\ \Delta X \end{bmatrix} - (w_{avg} * [VO])$$

where $$\begin{bmatrix} \Delta F \\ \Delta B \\ \Delta L \\ \Delta R \\ \Delta D \\ \Delta X \end{bmatrix} = \begin{bmatrix} {}^wLF - {}^wRF \\ {}^wLR - {}^wRR \\ {}^wLF - {}^wLR \\ {}^wRF - {}^wRR \\ {}^wLF - {}^wRR \\ {}^wRF - {}^wLR \end{bmatrix}$$

and [VO] is a vehicle offset matrix, representing a long term measure of the vehicle wheel speed response in the absence of external factors and in the absence of detected tire leaks. The [VO] matrix will be described in more detail later in this description. The calculated matrix [PD] is stored in controller memory for use later in this routine.

The routine next proceeds to block 48, to determine [PS], which is a matrix representing the summation of calculated [PD] matrices over a predetermined period of time. In this embodiment, the [PD] matrix is calculated every 100 milliseconds, per the above-described iteration rate of the routine illustrated in FIGS. 3a and 3b. Further, in this embodiment, the PS matrix is the sum of the most recent ten [PD] matrices and, as such, represents a sampling of wheel speed activity over the last one second of operation.

After determining the [PS] matrix, the routine moves to block 50, to compare each of the constituent elements of the [PS] matrix to a predetermined deadband value δ. This comparison is a means by which it may be efficiently determined at an early point in the execution of the routine whether the entries in the [PS] matrix indicate that the vehicle is not experiencing any excursions from what is assumed to be maneuver-free and leak-free operation. In other words, the inventors have determined that early on in this detailed analysis of wheel speed information, a relatively simple check can be made on the delta wheel speed information, by which the routine may ascertain that no suspicious activity is going on which may give rise to a later detection of a loss of pressure in one of the vehicle tires.

Accordingly, if all of the elements of the [PS] matrix are less than the deadband value δ, the routine of FIGS. 3a and 3b returns, via block 78, to the background routine of FIG. 2, as the difference in wheel speeds is so small that it is assumed that there are no substantial losses of tire pressure. However, if, at block 50, any element of the [PS] matrix exceeds δ, the routine must proceed to determine whether the deviation is the result of a vehicle maneuver, or is the result of a loss of pressure in one of the vehicle tires.

To carry out this further analysis, the routine proceeds to block 52, to normalize the [PS] matrix. The normalization process is merely a means to condition the elements of [PS] so as to provide a basis of comparison to likewise normalized predetermined comparison values. The process used in this embodiment is one recognized as a standard means of mathematical normalization, specifically, dividing each of the elements of the [PS] matrix by the absolute value of the element thereof with the largest magnitude. The normalized matrix, designated [PS]', has six elements, $PS_1'$ through $PS_6'$, all of which necessarily have a magnitude less than or equal to one.

The inventors contemplate that the above-described normalization process is merely one means of providing a basis of comparison between the elements of the [PS] matrix and likewise normalized values, and that other means of providing a basis of comparison may be equally suited for the purposes of this routine, and could be substituted at block 52 without departing from the true spirit of this invention.

The routine next proceeds to block 54, to calculate four characterization values. These values are derived from the elements of the normalized wheel speed pattern matrix [PS'], and characterize the vehicle behavior as described by the most recent one second of wheel speed data. The information is characterized so as to indicate whether the vehicle is in an operating state which normally has such a deleterious effect on the content of the wheel speed data that it is unlikely that any useful information will be available from that wheel speed data on the pressure of the vehicle tires.

Once the characterization values are calculated, if it is determined that the vehicle is operating in such a state, the routine will simply discard the most recent wheel speed information as being substantially valueless for the purposes of this routine, and will return to the background routine of FIG. 2 straight-away. However, if the vehicle is operating in such a state that valuable information on tire pressure may be derived from the wheel speed data, the routine will proceed to a derivation process, as described in blocks 59 through 76 of the routine of FIGS. 3a and 3b.

Specifically to carry out this process, the routine at block 54 calculates characterization values for vehicle maneuvers, such as an acceleration value ra, a deceleration value rd, a left turn value rl, and a right turn value rr, according to the following equations:

$$ra = 1/((PS_1' - PA_1)_2 = (PS_2' - PA_2)_2 = \ldots$$
$$= (PS_6' - PA_6)_2)$$
$$rd = 1/((PS_1' - PD_1)_2 = (PS_2' - PD_2)_2 = \ldots$$
$$= (PS_6' - PD_6)_2)$$
$$rl = 1/((PS_1' - PL_1)_2 = (PS_2' - PL_2)_2 = \ldots$$
$$= (PS_6' - PL_6)_2)$$
$$rr = 1/((PS_1' - PR_1)_2 = (PS_2' - PR_2)_2 = \ldots$$
$$= (PS_6' - PR_6)_2)$$

where the six elements of each of the [PA], [PD], [PL], and [PR] matrices are as shown in FIGS. 4b, 4d, 4f, and 4h, respectively. These matrices consist of predetermined, normalized values, taking on one of the three values −1, 0, or 1, which are meant to indicate the magnitude relationship between the speed of the respective wheels, as shown in the diagrams of FIGS. 4a, 4c, 4e, and 4g, while the vehicle is operating in one of a predetermined variety of operating conditions, such as acceleration, deceleration, or turning, with the assumption of equal pressure in the tires. However, use of tire pressure sensor 15 will alert the driver if all four tires are equally low or equally high compared to a predetermined tire pressure as will be discussed more fully below. Moreover, use of a steering sensor allows more robust detection for determining whether the vehicle is turning, also discussed more fully below.

For instance, a value of 0 indicates the speed of the two wheels normally will be substantially the same in the indicated operating condition. A value of −1 indicates that the second wheel has a greater speed than the first, and a value of 1 indicates that the first wheel has a greater speed than the second in the indicated operating condition. The ordering of the wheels for this purpose is as was described in the calculation of [PD] at block 46 of the routine of FIG. 3a. For example, referring to FIGS. 4a and 4b, [PA], the matrix representing normal wheel speed relationships during vehicle acceleration, shows that the two front wheels should be approximately the same speed, the two rear wheels should be approximately the same speed, and each of the front wheel speeds should be less than each of the rear wheel speeds.

Similarly, [PD], [PL], and [PR] characterize the wheel speed relationships during deceleration, left turn, and right turn, respectively. Furthermore, the inventors intend that other characterizations may be determined at this step beyond the four mentioned, that likewise may have a deleterious effect on the value of the wheel speed information, such as the presence of wind with a substantial cross-wind component, severe uphill or downhill travel, or operation with a tire slip condition. Matrices characterizing these additional external factors may be included herein without departing from the true spirit of this invention.

After determining the characterization values at step 54, the routine proceeds to step 56, to determine a [Δ1] matrix according to the following equation:

$$[\Delta I] = \begin{bmatrix} ra \\ rd \\ rl \\ rr \end{bmatrix} - \begin{bmatrix} tra \\ trd \\ trl \\ trr \end{bmatrix}$$

where tra, trd, trl, and trr are the threshold recognition values for the maneuvers of acceleration, deceleration, left turn, and right turn, respectively.

These recognition threshold values represent the approximate minimum magnitude of the recognition values ra, rd, rl, and rr that correspond to a material maneuver, which is a maneuver determined to be so substantial that the wheel speed information available while that maneuver is taking place is, in the context of tire pressure detection, substantially valueless. As mentioned, the inventors intend that other recognition values, and recognition threshold values could be included here, which also have a negative effect on the value of the wheel speed information vis-a-vis tire pressure detection.

Accordingly, if any recognition value exceeds or is equal to its corresponding recognition threshold value, the wheel speed data as determined and conditioned at the preceding blocks 42 through 54 is assumed to be so skewed that information on the present tire pressure either is not available from that data, or is too difficult to reproduce therefrom for the purposes of this routine. Accordingly, the data is discarded.

Specifically, the routine at block 56, determines the elements of the [Δ1] matrix by subtracting the recognition threshold values from their corresponding recognition values, as shown above. Next, at block 58, if any of the elements of the [Δ1] matrix are greater than or equal to zero, indicating that the wheel speed information may be skewed by a recent vehicle operating condition, the routine proceeds to block 78, to return to the background routine of FIG. 2 without saving the calculated PS matrix.

Alternatively, if all of the elements of the [Δ1] matrix are less than zero, the vehicle is assumed to be operating in a sufficiently stable operating condition that valuable tire pressure information may still be available from the wheel speed data Accordingly, the routine proceeds to blocks 59 through 76, to determine whether there is a substantial loss of pressure in any of the vehicle tires.

The routine thus proceeds to block 59, to store the elements of the [PS] matrix in controller random access memory 14 for future use. Next, the routine advances to block 60 to determine [PM], which is a matrix representing a sampling of delta wheel speed behavior over a predetermined period of time. For example, in this embodiment, the [PM] matrix is a summation of the ten most recent [PS] matrices and, as such represents a sampling of the delta wheel speed information over the most recent 10 seconds of operation.

The routine next moves to block 61, to store the elements of the [PM] matrix in controller random access memory 14 for later use. The routine proceeds next to block 62, to normalize the elements of the [PM] matrix, by dividing each [PM] element by the absolute value of the [PM] element with the largest magnitude, in the manner described above at block 52 of the routine of FIG. 3a. The matrix of six normalized values, $PM_1'$ through $PM_6'$, is then stored as [PM']. The normalizing block 62 is merely a means of conditioning the elements of the [PM] matrix, to put them in a form more useful for the mathematical purposes of the routine of FIG. 3b. However, the inventors envision that any means of preparing the delta wheel speed information for such mathematical manipulation as will be described shortly would be sufficient at block 62.

Next, the routine advances to block 64, to calculate rllf, rlrf, rllb, and rlrb, which are indicative of the degree of pressure degradation in each of the four tires of the vehicle. In other words, these four values are in such form that they indicate the tire pressure of each of the four vehicle tires. They generally are based on the aggregate deviation of the delta wheel speeds from a predetermined set of wheel speeds indicative of leaks in each of the four tires of the vehicle. They specifically are determined from the following equations:

$$rllf = 1/((PM_1' - PLLF_1)_2 = (PM_2' - PLLF_2)_2 = \ldots$$
$$= (PM_6' - PLLF_6)_2)$$
$$rlrf = 1/((PM_1' - PLRF_1)_2 = (PM_2' - PLRF_2)_2 = \ldots$$
$$= (PM_6' - PLRF_6)_2)$$
$$rllb = 1/((PM_1' - PLLB_1)_2 = (PM_2' - PLLB_2)_2 = \ldots$$
$$= (PM_6' - PLLB_6)_2)$$
$$rlrb = 1/((PM_1' - PLRB_1)_2 = (PM_2' - PLRB_2)_2 = \ldots$$
$$= (PM_6' - PLRB_6)_2)$$

where [PLLF], [PLRF], [PLLB], and [PLRB] are matrices with six elements each, representing normalized characterizations of each of the six delta wheel speed relationships experienced while the vehicle is undergoing a leak in one of its tires. As shown in FIGS. 5b, 5d, 5f, and 5h, the elements of these matrices take on one of the three values −1, 0, or 1. These values are meant to indicate the magnitude relationship between the speed of the respective wheels, as shown in FIGS. 5a, 5c, 5e, and 5g, while each individual tire is operating in a low pressure condition.

For instance, a value of 0 indicates the speed of the two wheels is substantially the same. A value of −1 indicates that the second wheel has a greater speed than the first, and a value of 1 indicates that the first wheel has a greater speed than the second. The ordering of the wheels for this purpose is as was described in the calculation of [PD] at block 46 of the routine of FIG. 3a. For example, referring to FIGS. 5a and 5b, [PLLF], the matrix representing normal wheel speed relationships while the left front tire is low in pressure, shows that the left front wheel should be rotating at a higher speed than the other three tires, and that the other three should be rotating at approximately the same speed.

Similarly, the [PLRF], [PLLB], and [PLRD] matrices characterize the wheel speed relationships with low pressure in the right front, left rear, and right rear tires, respectively. The six values in each of these matrices are normalized to illustrate the trend in comparative wheel speeds under the aforementioned leaks, and are shown specifically in FIGS. 5b, 5d, 5f, and 5h.

Accordingly, the four calculated values are summations of delta speed deviations for all of the delta speed values, between the present vehicle operating condition and the operating condition as should be expected for a leak in the front left tire, the front right tire, the left rear tire and the right rear tire, as discussed. After calculating the four values, the routine moves to block 66, to calculate a [Δ2] matrix, according to the following equation:

$$[\Delta 2] = \begin{bmatrix} rllf \\ rlrf \\ rllb \\ rlrb \end{bmatrix} - \begin{bmatrix} trllf \\ trlrf \\ trllb \\ trlrb \end{bmatrix}$$

where trllf, trlrf, trllb, and trlrb are threshold recognition values for leaks in each of the vehicle tires, including a left front tire leak, right front tire leak, left rear tire leak, and right rear tire leak, respectively.

These recognition threshold values represent the approximate minimum magnitude of the recognition values rllf, rlrf, rllb, and rlrb that correspond to a minimum leak, which is a leak determined to be of a degree that it can be detected and should be addressed. Accordingly, if any recognition value exceeds or is equal to its corresponding recognition threshold value, a leak of at least minimum size is assumed, and the vehicle operator is notified thereof.

Specifically, the routine at block 66, calculates the elements of the [Δ2] matrix, by subtracting the recognition threshold values from their corresponding recognition values as shown above. Next, at block 68, if any of the elements of the [Δ2] matrix are greater than or equal to zero, indicating the presence of at least one leak, the routine proceeds to block 70, to indicate the leak condition to the operator of the vehicle via a conventional indicating means 18, such as by illuminating a descriptive warning light on the instrument panel of the vehicle, or by sounding an aural alert in the vehicle cabin.

Further, the inventors intend that the leak indicating means may include means for distinguishing critical information on the leak itself, and apprising the vehicle operator of that information. For example, included in this information could be the location of the leak, which may be determined from the specific element of the [Δ2] matrix that is greater than or equal to zero as determined at block 68, or further the magnitude of the leak, which may be determined from the degree of deviation from zero at block 68, or still further the time history of the magnitude of the leak. Preferably, the magnitude of the leak may be determined more accurately by incorporating the pressure sensor 15 output in conjunction with a predetermined tire pressure. In this manner, regardless of whether the leak coincides with the tire having sensor 15 therewith, the magnitude of the leak may be more accurately defined. After apprising the driver of the detected leak, the routine proceeds to block 78, where it is directed to return to the background routine illustrated in FIG. 2.

Alternatively, if all of the elements of the [Δ2] matrix are less than zero, it is assumed that there are no material leaks in the vehicle tires, and the routine proceeds to block 71 to determine if a tire pressure indicated by sensor 15 indicates a pressure materially higher or lower than a predetermined optimum pressure. For example, if the operator parks the vehicle for an extended period of time in elevated temperatures, all of the tires may substantially deflate in equal proportion. In this case, all of the elements of the [Δ2] matrix are less than zero and will not indicate substantial deflation of the four tires since they have deflated proportionally. By incorporating tire pressure sensor 15 with the above described algorithm, such a condition may be detected. For instance at block 71, if a delta tire pressure (ΔTP) is less than or greater than a predetermined threshold value, then block 70 indicates a low/high pressure value depending on the sign of ΔTP. The ΔTP is the predetermined optimum tire pressure minus the actual tire pressure indicated by tire pressure sensor 15. If the resulting difference is a positive value, block 70 indicates low pressure while if the difference is negative, a high pressure is indicate at block 70. If the absolute value of delta TP is within the predetermined threshold, then block 72 determines if a tire reset has occurred since the last execution of block 72. A tire reset occurs either manually or automatically when the tires or wheels of the vehicle are changed.

The inventors have determined that a tire change will so substantially affect the elements of the vehicle offset matrix [VO], that upon a tire or wheel change, prior vehicle offset information will be substantially obsolete. As such, upon a tire or wheel change, old information contributing to the calculation of the elements of the [VO] matrix will be discarded, and only information accrued since the change will be factored into the determination of the [VO] matrix. As stated, the reset may be made manually, such as by switch actuation by the vehicle operator or by the tire or wheel change technician, or maybe made automatically, such as by a switch actuated-when the vehicle tires or wheels are changed.

Accordingly, if at block 72, a reset has occurred, the routine proceeds to block 74, to clear the elements of the prior [VO] matrix in controller memory. Next, or if there has not been a reset, the routine proceeds to block 76, to update the vehicle offset matrix [VO], according to the following equation:

$$[VO] = \begin{bmatrix} \Sigma(\Delta F/w_{avg}) \\ \Sigma(\Delta B/w_{avg}) \\ \Sigma(\Delta L/w_{avg}) \\ \Sigma(\Delta R/w_{avg}) \\ \Sigma(\Delta D/w_{avg}) \\ \Sigma(\Delta X/w_{avg}) \end{bmatrix}$$

where ΔF, ΔB, ΔL, ΔR, ΔD, and ΔX are the six delta wheel speed values as calculated at block 46 of FIG. 3a, and $w_{avg}$ is the present vehicle speed, as calculated above at block 44 of FIG. 3a. [VO] is a matrix that aggregates delta wheel speed values while the vehicle is operating in such a state that the four wheels of the vehicle ideally should be operating at the same speed, such that the delta speed values should be substantially zero. Any non-zero delta speed value indicates some bias in the readings not attributed to external factors such as vehicle maneuvers, and not attributed to tire leaks.

Such values are aggregated and scaled by the present vehicle speed at block 76, the scaling being required due to the dependence of the magnitude of the delta wheel speed values on overall vehicle speed. The resultant values are subtracted from delta wheel speed data at block 46, before that data is used for the purposes of this invention. The six constituent elements of the [VO] matrix are scaled sums including all delta speed values determined and stored from the last tire reset, subject to three constraints.

First, as is obvious from the flow of FIGS. 3a and 3b, the summed and scaled values do not include delta wheel speed information taken when the vehicle is subject to some external factor or is in some maneuver, such as accelerations or turns. Second, as is also obvious from the flow of FIGS. 3a and 3b, the summed scaled values do not include delta wheel speed information when a leak has been detected at block 68. Third, the summed scaled values in this embodiment only include a predetermined amount of past stored delta wheel speed data, as it is assumed that data eventually becomes stale in that it is only indicative of the "steady-state" vehicle behavior for a predetermined period of time after being calculated. In this embodiment, only ,data for at most approximately the last 20 hours of operation is used in the calculation of the [VO] matrix.

Accordingly, subject to the above-described three constraints, the vehicle offset is determined at block 76, after which the routine returns to the background routine of FIG. 2, via block 78. The use of the [VO] matrix in the determination of both vehicle maneuvers and tire leaks provides a means of adapting the leak sensing means to virtually all unmodeled disturbances in the sensed delta wheel speed values, thereby providing a leak detecting means less prone to false alarms. Further, the overall flexibility of the control provides for expansion of the coverage to such sources of false alarms as cross-winds, and travel on steep slopes.

In an alternative embodiment and referring to FIG. 1, a steering input via a steering wheel 80 is detected by a steering sensor 82. Steering sensor 82 in turn generates a signal 84 to controller 12 indicative of the steering input to steering wheel 80. For example, when steering wheel 80 is steering the vehicle in a substantially longitudinal direction with respect to the vehicle, sensor 82 generates signal 84 indicative that the vehicle wheels should be spinning at the same speed hen directed in the longitudinal direction absent any over/under inflation of any of the four wheels or absent any vehicle maneuvers. In this manner, the above described estimating/averaging algorithm can be more robust. More specifically, use of steering sensor 82 may facilitate determination that aggregate delta wheel speed values [VO] is indicative that the vehicle is operating in such a state that the four wheels of the vehicle ideally should be operating at the same speed, such that the delta speed values should be substantially zero. Any non-zero delta speed values indicates some bias in the readings not attributed to the vehicle turning when steering sensor 82 generates signal 84 indicative of an intended straight heading. Furthermore, when signal 84 is indicative that the vehicle is not turning, many of the predetermined states that delay the estimating algorithm to establish any speed variation among wheels is eliminated. Thus the determination of a low pressure wheel can be dramatically accelerated. Via the use of the steering sensor and wheel speed data from all four wheels a determination of a presence of a spare tire or a dramatically deflated tire can be determined within seconds of straight driving. This allows for a timely warning to the driver of the condition thus enhancing safety.

In the above described embodiments, it will be recognized that a vehicle having an antilock brake system (ABS) merely needs to add one tire pressure sensor 15, since the ABS system already includes wheel speed sensors 10a–10d with respective wheels for operation of the ABS system. To that end, by adding a single tire pressure sensor 15 to one of the four wheels and using the existing algorithm, a determination that not only is a tire is low, but also which one, and by approximately how much based on the differential speed of the tire with the tire pressure sensor and any other wheel. Also, the condition of all four tires being low, or high, can be immediately detected due to the available direct measurement afforded by tire pressure sensor 15. The cost of adding one tire pressure sensor as opposed to adding four tire pressure sensors provides a substantial cost savings when considering a possible future mandate by the Department of Transportation to have such tire pressure monitoring systems, which entails incorporation in about 16 million cars per year in the United States.

While the invention has been described with reference to an exemplary embodiment, it will be understood that by those skilled in the art the various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for indicating a pressure loss condition in tires of a vehicle, each tire having a speed related to vehicle speed and to vehicle operating condition, the method comprising:
storing a predetermined number of tire speed patterns, each tire speed pattern representing relative tire speed conditions corresponding to a respective normal vehicle operating condition which results in tire speed variations;
storing a predetermined tire pressure for the tires;
sensing the speed of each of the tires;
sensing the pressure of a single tire of the tires;
determining an actual tire speed pattern from the sensed speeds of the tires representing an actual relative tire speed condition; and
determining if the actual tire speed pattern corresponds to any one of the stored tire speed patterns, and
(A) if not, determining whether there is a pressure loss condition in the tires in accord with the actual tire speed pattern and the sensed tire pressure, and
(B) if so, bypassing the step of determining whether there is a pressure loss condition.

2. The method of claim 1, further comprising storing a respective tire speed pressure loss pattern for each tire representing a relative tire speed condition when said tire is experiencing a pressure loss condition, and wherein the determining a pressure loss condition includes comparing the actual tire speed pattern with the stored tire speed pressure loss patterns and indicating a pressure loss condition when the actual pattern corresponds to at least one of the stored tire speed pressure loss patterns.

3. The method of claim 2, further comprising comparing the sensed tire pressure of the single tire with the predetermined tire pressure for the tires and indicating a pressure loss condition when a difference therebetween exceeds a predetermined threshold value.

4. The method of claim 1, wherein the determining if the actual tire speed pattern corresponds to any one of the stored tire speed patterns includes employing a steering sensor configured to determine whether the vehicle is turning.

5. The method of claim 1, wherein the determining if the actual tire speed pattern corresponds to any one of the stored tire speed patterns is bypassed when a steering sensor indicates a straight vehicle heading and
(A) determining whether there is a pressure loss condition in the tires in accord with the actual tire speed pattern and the sensed tire pressure, and
(B) if so, bypassing the step of determining whether there is a pressure loss condition.

6. A method for indicating a pressure loss condition in tires of a vehicle, each tire having a speed related to vehicle speed and to vehicle operating condition, the method comprising:
storing a predetermined number of tire speed patterns, each tire speed pattern representing relative tire speed conditions corresponding to a respective normal vehicle operating condition which results in tire speed variations;
storing a predetermined tire pressure for the tires;
sensing the speed of each of the tires over a predetermined time period;
sensing the pressure of a single tire of the tires;
determining an actual tire speed pattern from the sensed speeds of the tires representing an actual relative tire speed condition, and from a predetermined offset value; and
determining if the actual tire speed pattern corresponds to any one of the stored tire speed patterns, and
(A) if not, determining whether there is a pressure loss condition in the tires in accord with the actual tire speed pattern and the sensed tire pressure, and
(B) if so, bypassing the step of determining whether there is a pressure loss condition.

7. The method of claim 6, further comprising storing a respective tire speed pressure loss pattern for each tire representing a relative tire speed condition when said tire is experiencing a pressure loss condition, and wherein the determining a pressure loss condition includes comparing the actual tire speed pattern with the stored tire speed pressure loss patterns and indicating a pressure loss condition when the actual pattern corresponds to at least one of the stored tire speed pressure loss patterns.

8. The method of claim 7, further comprising comparing the sensed tire pressure of the single tire with the predetermined tire pressure for the tires and indicating a pressure loss condition when a difference therebetween exceeds a predetermined threshold value.

9. The method of claim 6, wherein the determining if the actual tire speed pattern corresponds to any one of the stored tire speed patterns includes employing a steering sensor configured to determine whether the vehicle is turning.

10. The method of claim 6, wherein the determining if the actual tire speed pattern corresponds to any one of the stored tire speed patterns is bypassed when a steering sensor indicates a straight vehicle heading and
  (A) determining whether there is a pressure loss condition in the tires in accord with the actual tire speed pattern and the sensed tire pressure, and
  (B) if so, bypassing the step of determining whether there is a pressure loss condition.

11. An apparatus for indicating a pressure loss condition in tires of a vehicle, each tire having a speed related to vehicle speed and to vehicle operating condition comprising:
  storing means for storing a predetermined number of tire speed patterns, each tire speed pattern representing relative tire speed conditions corresponding to a respective normal vehicle operating condition which results in tire speed variations;
  storing means for storing a predetermined tire pressure for the tires;
  speed sensing means for sensing the speed of each of the tires;
  pressure sensing means for sensing the tire pressure of a single tire;
  determining means for determining an actual tire speed pattern from the sensed speeds of the tires representing an actual relative tire speed condition;
  means for comparing the actual tire speed pattern to the stored tire speed patterns, and for comparing the sensed tire pressure to the stored predetermined tire pressure; and
  pressure loss condition determining means for determining whether there is a pressure loss condition of the tires in accord with the actual tire speed pattern and sensed tire pressure, the pressure loss condition determining means being operative when the actual tire speed pattern does not correspond to any one of the stored tire speed patterns.

12. The apparatus of claim 11, further including a steering sensor configured to determine whether the vehicle is turning, wherein the pressure loss condition determining means being operative when the steering sensor indicates the vehicle is not turning.

13. The apparatus of claim 11, further comprising storing means for storing a respective tire speed pressure loss pattern for each tire resenting a relative tire speed condition when said tire is experiencing a pressure loss condition, and wherein the pressure loss condition determining means includes means for comparing the actual tire speed pattern to the stored tire speed pressure loss patterns, and means for indicating a pressure loss condition at least one of the actual tire speed pattern corresponds to at least one of the stored tire speed pressure loss patterns and the difference between the sensed tire pressure of the single tire and the predetermined tire pressure for the tires exceeds a predetermined threshold value.

14. An apparatus for indicating a pressure loss condition in tires of a vehicle, each tire having a speed related to vehicle speed and to vehicle operating condition comprising:
  storing means for storing a predetermined number of tire speed patterns, each tire speed pattern representing relative tire speed conditions corresponding to a respective normal vehicle operating condition which results in tire speed variations;
  storing means for storing a predetermined tire pressure for the tires;
  speed sensing means for sensing the speed of each of the tires over a predetermined time period;
  pressure sensing means for sensing the tire pressure of a single tire;
  determining means for determining an actual tire speed pattern from the sensed speeds of the tires representing an actual relative tire speed condition, and from a predetermined offset value;
  means for determining if the actual tire speed pattern corresponds to any one of the stored tire speed patterns, and for determining if the sensed tire pressure corresponds to the stored predetermined tire pressure; and
  pressure loss condition determining means for determining whether there is a pressure loss condition of the tires in accord with the actual tire speed pattern and sensed tire pressure, the pressure loss condition determining means being operative when the actual tire speed pattern does not correspond to any one of the stored tire speed patterns.

15. The apparatus of claim 14, further comprising storing means for storing a respective tire speed pressure loss pattern for each tire representing a relative tire speed condition when said tire is experiencing a pressure loss condition, and wherein the pressure loss condition determining means includes means for comparing the actual tire speed pattern to the stored tire speed pressure loss patterns, and means for indicating a pressure loss condition if at least one of the actual tire speed pattern corresponds to at least one of the stored tire speed pressure loss patterns and the difference between the sensed tire pressure of the single tire and the predetermined tire pressure for the tires exceeds a predetermined threshold value, and means for adjusting the predetermined offset means by an amount related to the sensed speed of the tires if the actual tire speed pattern does not correspond to any one of the stored tire speed pressure loss patterns.

16. The apparatus of claim 14, further including a steering sensor configured to determine whether the vehicle is turning, wherein the pressure loss condition determining means being operative when the steering sensor indicates the vehicle is not turning.

17. An apparatus for indicating a pressure loss condition in tires of a vehicle, each tire having a speed related to vehicle speed and to vehicle operating condition comprising:
  a first memory storage configured to store a predetermined number of tire speed patterns, each tire speed pattern representing relative tire speed conditions corresponding to a respective normal vehicle operating condition which results in tire speed variations;
  a second memory storage configured to store a predetermined tire pressure for the tires;

a wheel speed sensor in operable communication with each tire, each of the corresponding wheel speed sensor configured to sense the speed of each respective tire and generate a corresponding signal indicative thereof, a single tire pressure sensor in operable communication with a single tire, said tire pressure sensor configured to generate a signal indicative of a tire pressure of the single tire; and a controller configured to receive the signals indicative of wheel speed and single tire pressure, the controller being configured to determine an actual tire speed pattern from the sensed speeds of the tires representing an actual relative tire speed condition, the controller being configured to compare the actual tire speed pattern to the stored tire speed patterns, and configured to compare the sensed tire pressure to the stored predetermined tire pressure, wherein the controller determines whether there is a pressure loss condition of the tires in accord with the actual tire speed pattern and sensed tire pressure, the pressure loss condition being operative when the actual tire speed pattern does not correspond to any one of the stored tire speed patterns.

18. The apparatus of claim 17, further including a steering sensor configured to determine whether the vehicle is turning, wherein the pressure loss condition is operative when the steering sensor indicates the vehicle is not turning.

19. The apparatus of claim 17, further comprising a third memory storage configured to store a respective tire speed pressure loss pattern for each tire representing a relative tire speed condition when said tire is experiencing a pressure loss condition, and wherein the pressure loss condition is configured to compare the actual tire speed pattern to the stored tire speed pressure loss patterns, and configured to indicate a pressure loss condition if at least one of the actual tire speed pattern corresponds to at least one of the stored tire speed pressure loss patterns and the difference between the sensed tire pressure of the single tire and the predetermined tire pressure for the tires exceeds a predetermined threshold value.

20. The apparatus of claim 17, wherein each of the corresponding wheel sensors comprises at least one of a wheel speed sensor, a wheel rotation sensor, a wheel position sensor, a rotary encoder, a temperature sensor, a steering wheel, a differential and a wheel slip sensor.

21. The apparatus of claim 17, wherein said single tire pressure sensor is operable to provide a measured pressure output to said controller via a wireless communication link.

22. The apparatus of claim 17, wherein said controller includes a microprocessor.

23. The apparatus of claim 17, wherein said single pressure sensor includes a pressure transducer, and a transmitter.

24. The apparatus of claim 23, wherein said transmitter of said pressure sensor comprises a radio frequency transmitter.

25. The apparatus of claim 24, wherein said controller includes a radio frequency antenna and receiver circuitry.

26. The apparatus of claim 17, wherein said set of tires includes four tires of a vehicle and said self training tire pressure monitoring system comprises a single pressure sensor and first, second, third and fourth wheel senors.

27. The apparatus of claim 26, wherein each of said first, second, third and fourth wheel speed sensors is positioned at a corresponding one of said at least four tires of the vehicle and said single tire pressure is mounted with respect to one of the tires of the vehicle.

28. The apparatus of claim 17, wherein said controller is positioned at, within or on an interior rearview mirror assembly of the vehicle.

* * * * *